United States Patent [19]

Mashigan

[11] 4,123,099

[45] * Oct. 31, 1978

[54] CLOSURE FOR TRUCK BED

[75] Inventor: Charles Mashigan, Redford, Mich.

[73] Assignee: American Motors Corporation, Southfield, Mich.

[*] Notice: The portion of the term of this patent subsequent to Sep. 26, 1995, has been disclaimed.

[21] Appl. No.: 793,584

[22] Filed: May 4, 1977

[51] Int. Cl.² .............................................. B60P 3/42
[52] U.S. Cl. ................................. 296/10; 296/23 MC
[58] Field of Search .................. 296/24 R, 23 MC, 10

[56] References Cited

U.S. PATENT DOCUMENTS

| | | | |
|---|---|---|---|
| 3,741,605 | 6/1973 | Lee | 296/10 |
| 3,850,471 | 11/1974 | Johnson | 296/23 MC |
| 3,897,970 | 8/1975 | Gattenby | 296/23 MC |
| 3,995,890 | 12/1976 | Fletcher | 296/10 |

*Primary Examiner*—Joseph F. Peters, Jr.
*Assistant Examiner*—Donn McGiehan
*Attorney, Agent, or Firm*—Reising, Ethington, Barnard, Perry & Brooks

[57] ABSTRACT

A removable rear bed closure for a truck is disclosed as incorporating an upper roof portion and side walls that cooperatively define a rear opening with downwardly projecting hinge pillars of the side walls pivotally supporting associated rear doors for movement between open and closed positions about vertical axes. Each door has an upper end that seals with the upper roof portion and a lower end that seals with the truck bed in the door closed position. The hinge pillars are located laterally inward from truck bed side wall mounted taillights so as to not hide the taillights from view and the hinge pillars are located in longitudinal alignment with the bed side walls rearward thereof such that the rear opening has approximatey the same lateral width as the bed. Detachable securement of the closure side walls and the bed side walls to each other permits removal of the closure when desired. The closure side walls are spaced from each other the same distance the bed side walls are spaced from each other at the juncture of the side walls so as to have a smooth exterior transition between the bed and closure side walls. Padded shelves at the juncture of the side walls have apertured trim panels extending downwardly therefrom so as to provide storage compartments in cooperation with the bed side walls. At the front end of the closure, a front roof portion extends downwardly and forwardly in an inclined orientation from the front roof portion to the truck cab. A window seal is positioned between the cab and the closure to provide a sealed communication through associated window openings. Skirts on the closure side walls cover the juncture thereof with the bed side walls.

7 Claims, 3 Drawing Figures

CLOSURE FOR TRUCK BED

BACKGROUND OF THE INVENTION

1. Field of the Invention

This invention relates to a detachable closure for a truck bed which provides the truck with an enclosed rear cargo and/or occupant compartment.

2. Description of the Prior Art

Trucks have previously utilized rear closures detachably secured to the beds thereof in order to provide an enclosed cargo and/or occupant compartment. Such closures are usually secured in position by a releasable toggle latch mechanism or the like in order to retain the closure on the truck bed. Access to the compartment defined by the closure is usually provided by opening of the conventional rear bed tailgate and an upper window that pivots about a horizontal axis where it is connected to the closure roof. For the most part, such closures do not have sufficient height so that a seat can be mounted within the compartment enclosed thereby such that occupants can be seated comfortably during travel.

SUMMARY OF THE INVENTION

An object of the present invention is to provide an improved removable closure for a truck bed so as to permit convenient entrance and egress to and from the compartment enclosed thereby.

In carrying out the above object, the closure includes an upper roof portion positioned above the truck bed and side walls extending downwardly therefrom to a juncture with side walls that extend upwardly from the truck bed. A detachment securement means such as a toggle latch mechanism or the like is utilized to secure the closure and bed side walls to each other so that the closure can be removed. Downwardly projecting hinge pillars of the closure side walls cooperate with the upper roof portion and the truck bed to define a rear opening through which the compartment is accessible. A pair of rear doors respectively supported by the hinge pillars for movement about vertical axes have upper ends that seal at the upper roof portion and lower ends that seal at the bed upon positioning in a door closed position. Movement of one or both doors to an open position allows an occupant to enter or leave the compartment. Each hinge pillar is located laterally inward from a taillight supported on the associated truck bed side wall and thus does not hide the taillight from view and the hinge pillars are located in longitudinal alignment with the bed side walls rearward thereof such that the rear opening has approximately the same lateral width as the bed.

Preferably, the upper roof portion of the closure is located at a height which is high enough to permit a seat to be mounted within the compartment but low enough so that the truck can be driven through a conventional garage door opening with a door positioned at the standard height. As such, the upper roof portion of the closure is located at a higher elevation than the truck cab roof and a front roof portion is provided extending downwardly and forwardly in an inclined orientation from the upper roof portion to the truck cab roof in a streamlined manner. Windows of the truck cab and the closure are communicated by a seal positioned therebetween so that the compartments of the cab and the closure are communicated with each other while sealed from the environment. Windows are also provided in the side walls of the closure so that the occupants therein can view the environment.

At the juncture between the closure and bed side walls, the closure side walls are spaced from each other the same distance the bed side walls are spaced from each other so that there is a smooth exterior transition between the bed and closure side walls. Lower ends of the closure side walls have downwardly projecting skirts covering the side wall juncture and are provided with padded shelves. Apertured trim panels of the bed side walls extend downwardly from the padded shelves and provide storage compartments at the sides of the enclosed truck bed.

The objects, features, and advantages of the present invention are readily apparent from the following detailed description of the preferred embodiment taken in connection with the accompanying drawings.

DETAILED DESCRIPTION OF THE PREFERRED EMBODIMENT

Figure 1:
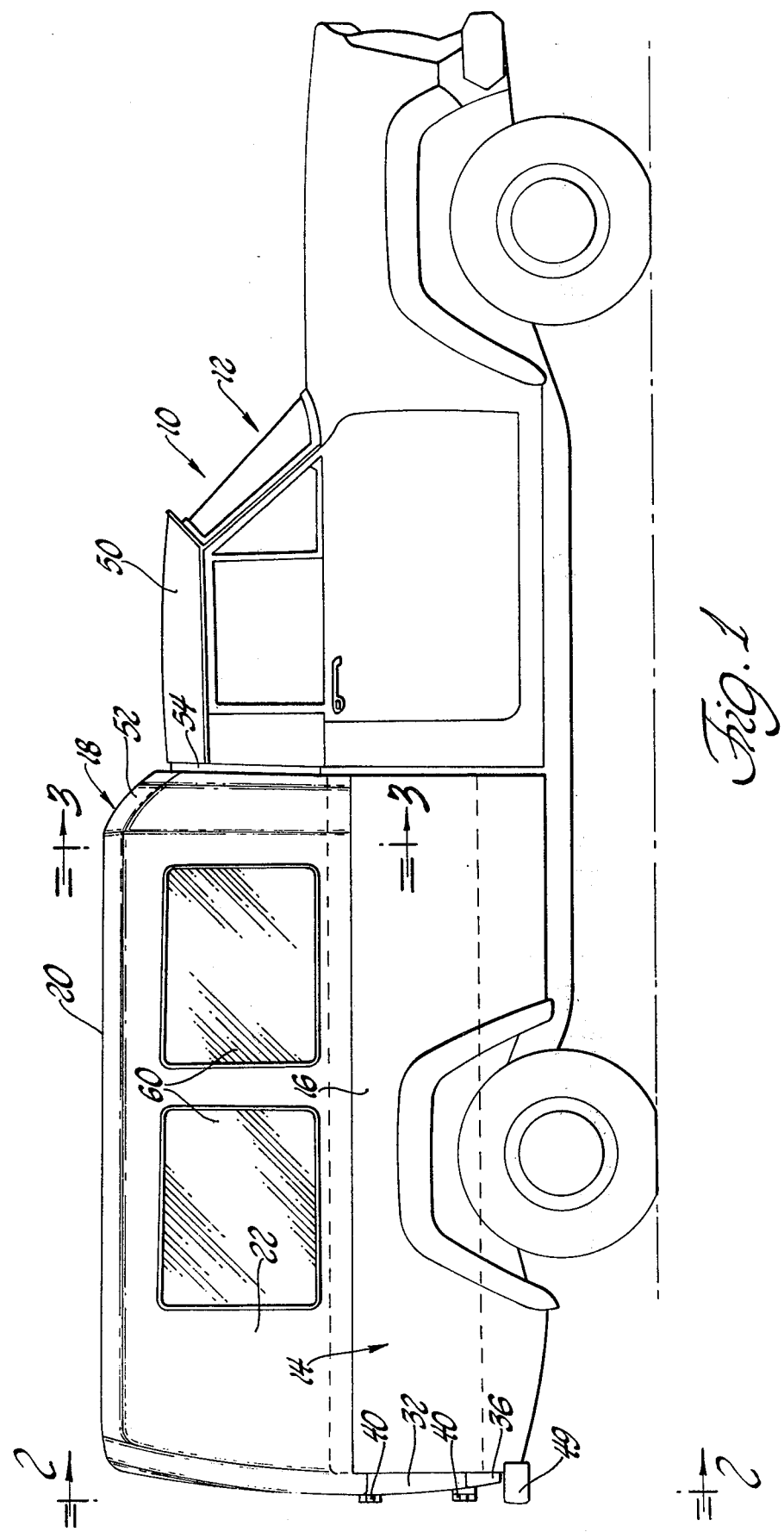
FIG. 1 is a side elevation view of a truck and a removable bed closure thereof according to the invention for providing a rear cargo and/or occupant compartment.

Referring to FIG. 1, a vehicle in the form of a truck 10 has a front cab 12 as well as a rear bed 14 with upwardly projecting side walls 16 that are spaced laterally from each other. A removable closure 18 cooperates with the truck bed in defining a cargo and/or occupant compartment to the rear of the truck cab.

Figure 2:
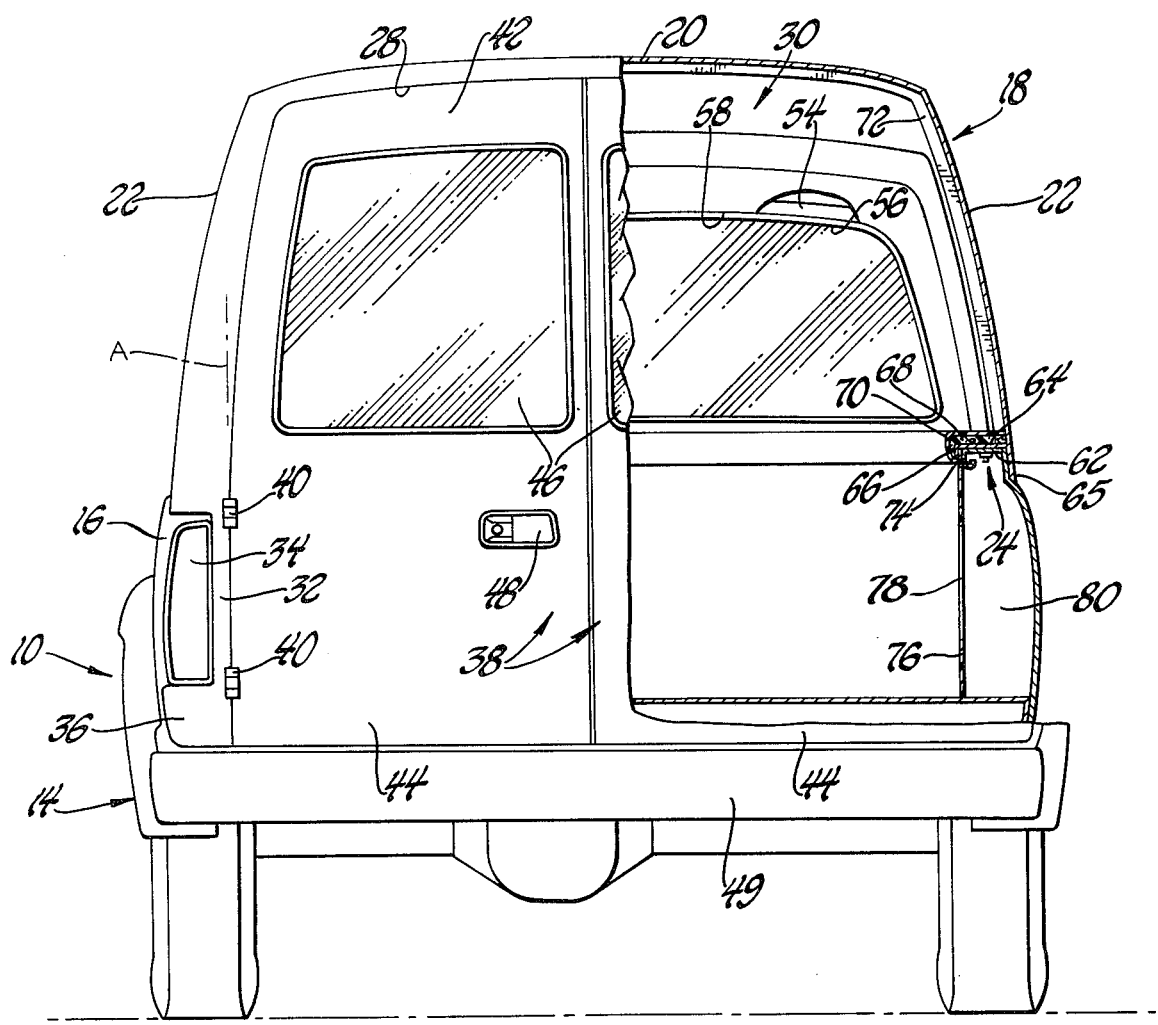
FIG. 2 is a partially broken away rear elevation view taken along line 2—2 of FIG. 1.

With combined reference to FIGS. 1 and 2, closure 18 includes an upper roof portion 20 positioned above the bed and closure side walls 22 extending downwardly from the roof portion to the bed side walls 16. A detachable securement means 24 (FIG. 2) is utilized to secure the bed and closure side walls to each other at the juncture thereof in a manner which is hereinafter more fully described in detail. At the rear end of the truck, the truck bed 14 cooperates with the closure upper roof portion 20 and side walls 22 to define a rear opening 28 through which the enclosed compartment 30 is accessible. Hinge pillars 32 project downwardly from the closure side walls 22 rearward of the bed side walls 16 at each side of the truck bed and are located laterally from the inward associated taillights 34 (only one shown) supported on the truck bed side walls 16 so as to not hide the taillights from view. Hinge pillars 32 are located in longitudinal alignment with the bed side walls 16 such that the rear opening has approximately the same lateral width as the bed. At their lower ends, the hinge pillars 32 have lateral projections 36 that extend in an outboard direction so as to bound the associated taillight 34 on three sides in an aesthetically appealing manner. A pair of symmetrical doors 38 shown in FIG. 2 (one of which is only partially shown) are each supported on the adjacent hinge pillar 32 by a pair of hinges 40 for pivotal movement about an axis A between open and closed positions with respect to the rear opening 28. Each door 38 has an upper end 42 that seals with the upper roof portion 20 of the closure and a lower end 44 that seals with the bed 14 in the closed position. A door window 46 is located generally at the upper half of each door 38 above a door handle 48. Rear bumper 49 provides a step that is used during entering or exiting the closure compartment with one of the doors 38 opened.

As can be seen best in FIG. 1, the closure roof 20 is located at a higher elevation than the cab roof 50. Preferably, the height of this closure roof 20 is high enough so that a passenger seat can be mounted within the compartment defined by the closure but low enough so that the truck can be driven through a conventional garage door opening with an open door thereof positioned at the standard height. In order to accommodate for the difference in elevations between the closure and cab roofs 20 and 50, a front roof portion 52 of the closure extends downwardly and forwardly from the upper roof portion thereof to the cab roof in the streamlined manner which is shown. At the juncture between the truck cab 12 and closure 18, the seal 54 seals between window openings 56 and 58 (FIG. 2) of the cab and closure. Sliding windows may be utilized between these windows openings so that the cab and closure compartments are open to each other with the seal 54 providing a sealed condition with respect to the environment. Also, side windows 60 in the closure side walls 22 give a seated occupant within the closure compartment additional viewing area.

Figure 3:
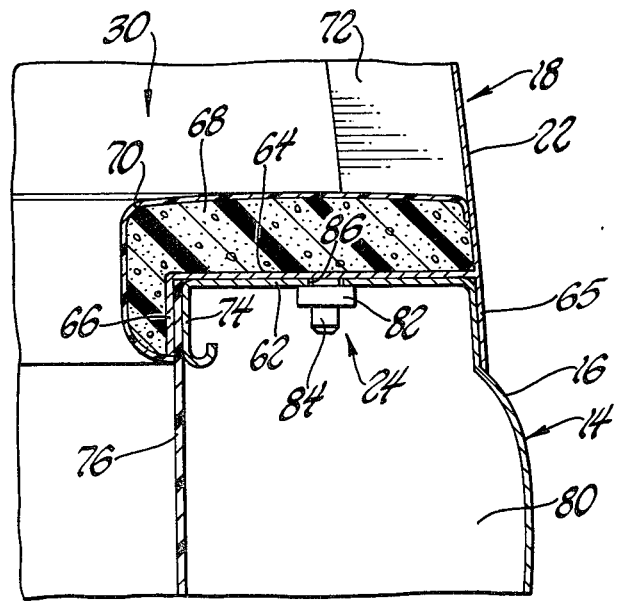
FIG. 3 is an enlarged view of a portion of FIG. 2 taken along line 3—3 of FIG. 1.

With combined reference to FIGS. 2 and 3, the bed side walls 16 and the closure side walls 22 have respective inwardly extending flanges 62 and 64 at their juncture. Closure side walls 22 are spaced laterally from each other the same distance at this juncture as are the bed side walls 16 so that there is a smooth exterior transition between the closure and bed side walls. A downwardly projecting skirt 65 of each closure side wall 22 covers the juncture of the flanges. Flange 64 of the closure side wall has an inner end 66 that is bent downwardly and is covered by foam 68 having a trim material 70 thereon to thereby provide a padded shelf. Suitable reinforcing frame members 72 secured to the inner side of the closure side walls 22 and the upper roof portion 20 extend between the padded shelves at each side of the compartment. Flange 62 of the bed side walls 16 also has an inner end 74 that is bent downwardly with a rolled lower bead. A suitable trim panel 76 has an upper end secured between the inner ends 66 and 74 of the flanges and includes one or more apertures 78 (FIG. 2) so as to permit access to a storage compartment 80 defined below the adjacent padded shelf by the trim panel and the bed side wall 16.

As can be best seen in FIG. 3, the detachable means 24 for securing the closure 18 to the truck includes a schematically indicated toggle latch mechanism 82 that latches to a keeper 84. An upper end of the keeper 84 is mounted in a suitable manner on the lower side of the closure side wall flange 64 so that the keeper extends downwardly through a hole 86 in the bed side wall flange 62. The toggle latch mechanism 82 is movable between latching and nonlatching positions in a conventional manner so selectively retain or release the flanges 62 and 64 in order to permit securement or removal of the closure from the truck cab.

While a preferred embodiment of the invention has herein been described, those skilled in the art will recognize various alternative designs and embodiments for practicing the present invention as defined by the following claims.

What is claimed:

1. A removable rear bed closure for a truck having laterally spaced side walls extending upwardly from the bed behind a front cab, the bed side walls having rear ends including taillights supported thereby, said closure comprising: an upper roof portion positioned above the bed; closure side walls extending downwardly from the bed side walls to the roof portion; the closure side walls and roof portion having rear ends that cooperate with the bed to define a rear opening; means for detachably securing the closure to the bed; and said rear ends of the closure side walls having downwardly projecting hinge pillars located laterally inward from the taillights; said hinge pillars being located rearwardly of the bed side walls in longitudinal alignment therewith such that the rear opening has approximately the same lateral width as the bed; a pair of rear doors respectively supported by the hinge pillars for pivotal movement about vertical axes between open and closed positions with respect to the rear opening; and each door having an upper end that seals at the upper roof portion and a lower end that seals at the bed in the door closed position.

2. A closure as in claim 1 further including a front roof portion that extends downwardly and forwardly to the cab from the tupper roof portion, and a window seal positioned between the cab and the closure.

3. A closure as in claim 1 further including side windows in the side walls thereof and padded shelves at the lower ends of its side walls.

4. In combination with a track having a bed and laterally spaced side walls extending upwardly from the bed behind a front cab, the bed side walls having rear ends including taillights supported thereby, a removable closure comprising: an upper roof portion positioned above the bed; closure side walls extending upwardly from a juncture with the bed side walls to the roof portion; the closure side walls being spaced from each other the same distance the bed side walls are spaced from each other at the juncture of the side walls so as to have a generally smooth exterior transition between the bed side walls and the closure side walls; the closure side walls and roof portion having rear ends that cooperate with the bed to define a rear opening; means for detachably securing the closure to the bed; said rear ends of the closure side walls having downwardly projecting hinge pillars located laterally inward from the taillights; said hinge pillars being located rearwardly of the bed side walls in longitudinal alignment therewith such that the rear opening has approximately the same lateral width as the bed; a pair of rear doors respectively supported by the hinge pillars for pivotal movement about vertical axes between open and closed positions with respect to the rear oepning; and each door having an upper end that seals at the upper roof portion and a lower end that seals at the bed in the door closed position.

5. A truck and closure as in claim 4 further including apertured trim panels that cooperate with the bed side walls to provide storage compartments, padded shelves on the lower ends of the closure side walls, and windows in the closure side walls.

6. In combination with a truck having a bed and laterally spaced side walls extending upwardly from the bed behind a front cab, the bed side walls having rear ends including taillights supported thereby, a removable closure comprising: an upper roof portion positioned above the bed; a front roof portion that extends downwardly from the upper roof portion to the cab in an inclined orientation; a window seal between the cab and the closure; closure side walls extending upwardly from the bed side walls to the roof portion; the closure side walls being spaced from each other the same distance the bed side walls are spaced from each other at the juncture of the side walls so as to have a generally smooth exterior transition between the bed side walls and the closure side walls; the closure side walls and roof portion having rear ends that cooperate with the bed to define a rear opening; means for detachably securing the closure to the bed; said rear ends of the closure side walls having downwardly projecting hinge pillars located laterally inward from the taillights; said hinge pillars being located rearwardly of the bed side walls in longitudinal alignment therewith such that the rear opening has approximately the same lateral width as the bed; a pair of rear doors respectively supported by the hinge pillars for pivotal movement about vertical axes between open and closed positions with respect to the rear opening; and each door having an upper end that seals at the upper roof portion and a lower end that seals at the bed in the door closed position.

7. A truck and closure as in claim 6 wherein the closure side walls have downwardly projecting skirts that cover the juncture of the truck and closure side walls.

* * * * *

UNITED STATES PATENT AND TRADEMARK OFFICE
CERTIFICATE OF CORRECTION

PATENT NO. : 4,123,099

DATED : October 31, 1978

INVENTOR(S) : Charles Mashigan

It is certified that error appears in the above-identified patent and that said Letters Patent are hereby corrected as shown below:

Column 3, line 21 "windows" should be --window--.

Column 3, line 60 "so" should be --to--.

Column 4, line 6 "downwardly" should be --upwardly--.

Column 4, line 24 "tupper" should be --upper--.

Signed and Sealed this

Tenth Day of April 1979

[SEAL]

Attest:

RUTH C. MASON
*Attesting Officer*

DONALD W. BANNER
*Commissioner of Patents and Trademarks*